United States Patent
Daikokuya et al.

(10) Patent No.: US 8,364,893 B2
(45) Date of Patent: Jan. 29, 2013

(54) RAID APPARATUS, CONTROLLER OF RAID APPARATUS AND WRITE-BACK CONTROL METHOD OF THE RAID APPARATUS

(75) Inventors: Hidejirou Daikokuya, Kawasaki (JP); Mikio Ito, Kawasaki (JP); Kazuhiko Ikeuchi, Kawasaki (JP); Chikashi Maeda, Kawasaki (JP); Hideo Takahashi, Kawasaki (JP); Yoshihito Konta, Kawasaki (JP); Norihide Kubota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 576 days.

(21) Appl. No.: 12/179,942

(22) Filed: Jul. 25, 2008

(65) Prior Publication Data

US 2009/0063769 A1    Mar. 5, 2009

(30) Foreign Application Priority Data

Aug. 28, 2007  (JP) ................. 2007-221721

(51) Int. Cl.
*G06F 12/16* (2006.01)
(52) U.S. Cl. ................. 711/114; 711/E12.103
(58) Field of Classification Search .......... None
See application file for complete search history.

(56) References Cited

U.S. PATENT DOCUMENTS

| 5,572,660 A * | 11/1996 | Jones ................. 714/6.12 |
| 5,802,572 A | 9/1998 | Patel et al. |
| 2005/0223168 A1 | 10/2005 | Ohmura |
| 2006/0206752 A1 * | 9/2006 | Ikeuchi et al. ............ 714/6 |

FOREIGN PATENT DOCUMENTS

| JP | 09-259036 | 10/1997 |
| JP | 2005-293205 | 10/2005 |

* cited by examiner

*Primary Examiner* — Denise Tran
(74) *Attorney, Agent, or Firm* — Staas & Halsey LLP

(57) ABSTRACT

A RAID apparatus includes a plurality of recording devices, a first adaptor connected to a first interface which is connected to a high-level apparatus, a controller for controlling processing of data transmitted by the high-level apparatus, and a second adaptor that connects to a second interface connected to a plurality of recording devices. The controller has a first memory area in which said data are stored, a second memory area used for a write-back of the data in said plurality of recording devices, a write-back information control unit controlling a write-back type of data stored in the first memory area and a usage state of the second memory area, a write-back data determination unit for determination of data to be written-back based on the write-back information, and a write-back execution unit for executing a write-back of the data to be written back on the plurality of recording devices.

15 Claims, 4 Drawing Sheets

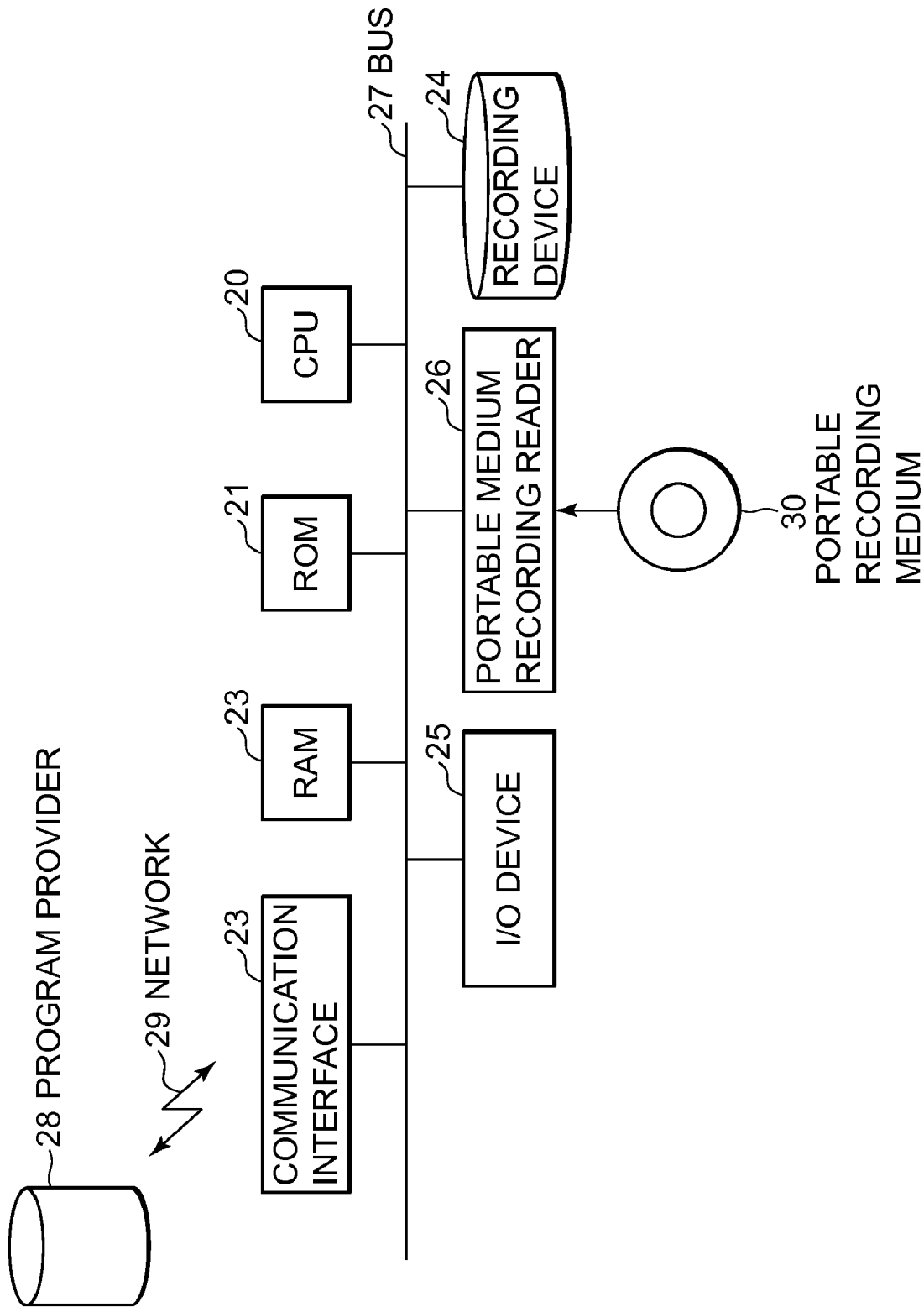

RAID APPARATUS, CONTROLLER OF RAID APPARATUS AND WRITE-BACK CONTROL METHOD OF THE RAID APPARATUS

CROSS-REFERENCE TO RELATED APPLICATIONS

This application is related to and claims priority to Japanese patent application no. 2007-221721 filed on Aug. 28, 2007 in the Japan Patent Office, the entire contents of which are incorporated by reference herein.

BACKGROUND

1. Field

The present invention relates to a RAID apparatus, a controller of the RAID apparatus and a write-back control method of the RAID apparatus.

2. Description of the Related Art

Hard disk drives characterized by data non-volatility and high capacity are in widespread use as external recording devices of computers. A Redundant Arrays of Independent (Inexpensive) Disks (RAID) apparatus is used for duplicating data and storing the data in a plurality of hard disk drives, or storing the data with redundant information such as parity data.

A RAID controller apparatus controlling data transmission between the RAID apparatus and a host computer may be equipped with a high capacity cache memory. The high capacity cache memory may buffer data to improve a data rate. The RAID controller connects to a plurality of hard disk drives and controls them in accordance with each RAID level.

With a RAID apparatus, when the host computer writes data, the data are stored in the cache memory and then written back to the hard disk drives asynchronously. The data write-back to the hard disk drives is executed from the least-frequently accessed data with the Least Recently Used (LRU) method in consideration of overall performance of the RAID apparatus.

For a typical RAID apparatus, a summation of the capacities of the hard disk drives is much higher than a capacity of the cache memory. Therefore, efficient write-back is required to increase free space of the cache memory to use the RAID apparatus in an effective way.

However, a load on the hard disk drive will be heavy and the write-back efficiency of the entire RAID apparatus will be reduced if the write-backs are concentrated on a specific hard disk drive. Hence, the hard disk drive that is frequently used for the write-back is exempt from a write-back scheduling.

A RAID apparatus needs a buffer to calculate the parity in the write-back when supporting a RAID4, RAID5 or RAID6 level. Consequently, the more hard disk drives for RAID4, RAID5 or RAID6 levels are used, the more buffers are needed. Needing more buffers causes a problem in that even when the loads on the hard disk drives are light, the write-back process may be suspended due to a buffer shortage.

Other accesses to the cache memory are exclusively controlled during the writing-back process. Thus, when the write-back process is suspended, other processes commanded by the host computer are interfered with for a certain amount of time. In addition, when the write-back being processed is revoked due to RAS processing, the withdrawal takes time.

SUMMARY

In accordance with an aspect of an embodiment, a RAID apparatus includes a plurality of recording devices, a first adaptor that connects to a first interface connected to a high-level apparatus, a controller for controlling processing of data transmitted by the high-level apparatus, and a second adaptor that connects to a second interface connected to a plurality of recording devices in which the data are stored. The controller has a first memory area in which the data are stored, a second memory area used for a write-back of the data in the plurality of recording devices, a write-back information control unit controlling a write-back type of data stored in the first memory area and a usage state of the second memory area, a write-back data determination unit for determination of data to be written-back based on the write-back information, and a write-back execution unit for executing a write-back of the data to be written back on the plurality of recording devices.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is a functional block diagram showing a structure of a computer executing a RAID control program in this embodiment.

DETAILED DESCRIPTION OF THE PREFERRED EMBODIMENT

Figure 1:
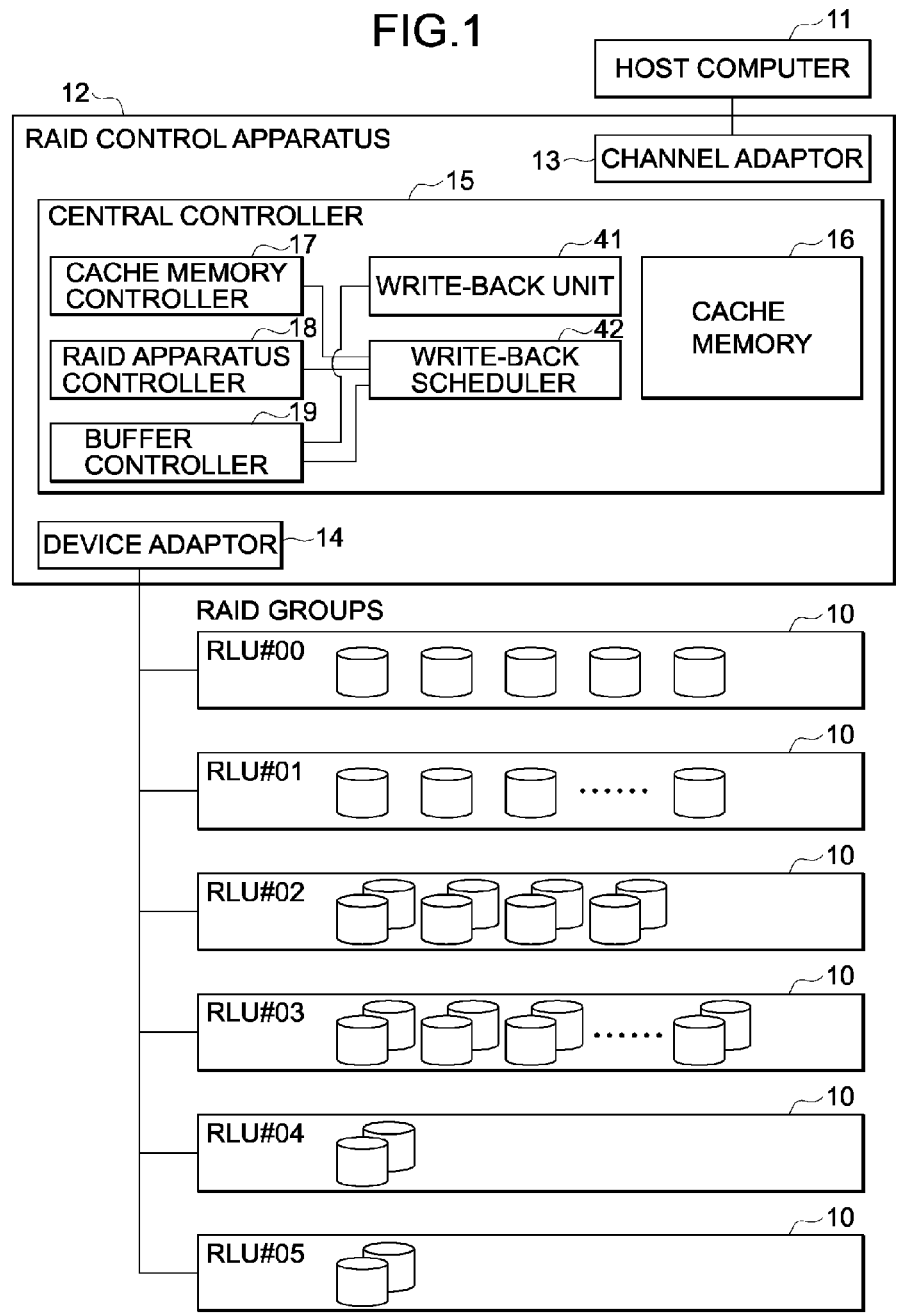
FIG. 1 is a functional block diagram showing a structure of the RAID apparatus in this embodiment.

Reference may now be made in detail to embodiments of the present invention, examples of which are illustrated in the accompanying drawings, wherein like reference numerals refer to like elements throughout.

Referring to accompanying drawings, a preferred embodiment of the RAID apparatus, the controller of the RAID apparatus and the write-back control method of the RAID apparatus will be discussed.

First, the structure of the RAID apparatus in this embodiment will be discussed. FIG. 1 is a functional block diagram showing the structure of the RAID apparatus in this embodiment. As shown in FIG. 1, a RAID apparatus 1 includes a plurality of RAID groups 10 and a RAID control apparatus 12. This RAID apparatus 1 supports RAID 4, RAID 5, RAID 6 and other RAID levels.

In FIG. 1, the RAID apparatus 1 includes six RAID groups of RAID logical units (RLU) 00-05. Of the RLUs, a RLU 04 and a RLU 05 are RAID 1 level. A RLU 00 and a RLU 01 are RAID 5 level. The RLU 00 includes 5 hard disk drives: 4 of which are for data storage, 1 of which is for parity storage. The RLU 01 includes 16 hard disk drives: 15 of which are for data storage, 1 of which is for parity storage. A RLU 02 and a RLU 03 are RAID 1+0 level. The RLU 02 includes 8 hard disk drives: 4 of which are for data, 4 of which are for mirroring. The RLU 03 includes 16 hard disk drives: 8 of which are for data, 8 of which are for mirroring.

The RAID control apparatus 12 is an apparatus for controlling data write to the RAID groups 10 and data read from the RAID groups 10. The RAID control apparatus 12 has a channel adopter 13 for controlling data transmission with the host computer 11, a device adaptor 14 for controlling data transmission with the RAID groups 10 and a central controller 15.

The central controller 15 is an apparatus for controlling the RAID control apparatus 12 entirely. The central controller 15 has a cache memory 16, a cache memory controller 17, a RAID apparatus controller 18, a buffer controller 19, a write-back unit 41 and a write-back scheduler 42.

The cache memory 16 is a memory for buffering data transmitted between the host computer 11 and the RAID groups 10. The cache memory controller 17 is a controller for controlling the cache memory 16 and cache data states. The cache data states are classified such as: a state that the data stored in the cache is written in the hard disk drive or is not written in the hard disk drive, in other words, whether the date is dirty data or not, a state that the data are being written or not, or a state that another exclusive process is being executed or not. The cache memory controller 17 controls the cache data with the LRU method.

Figure 2:
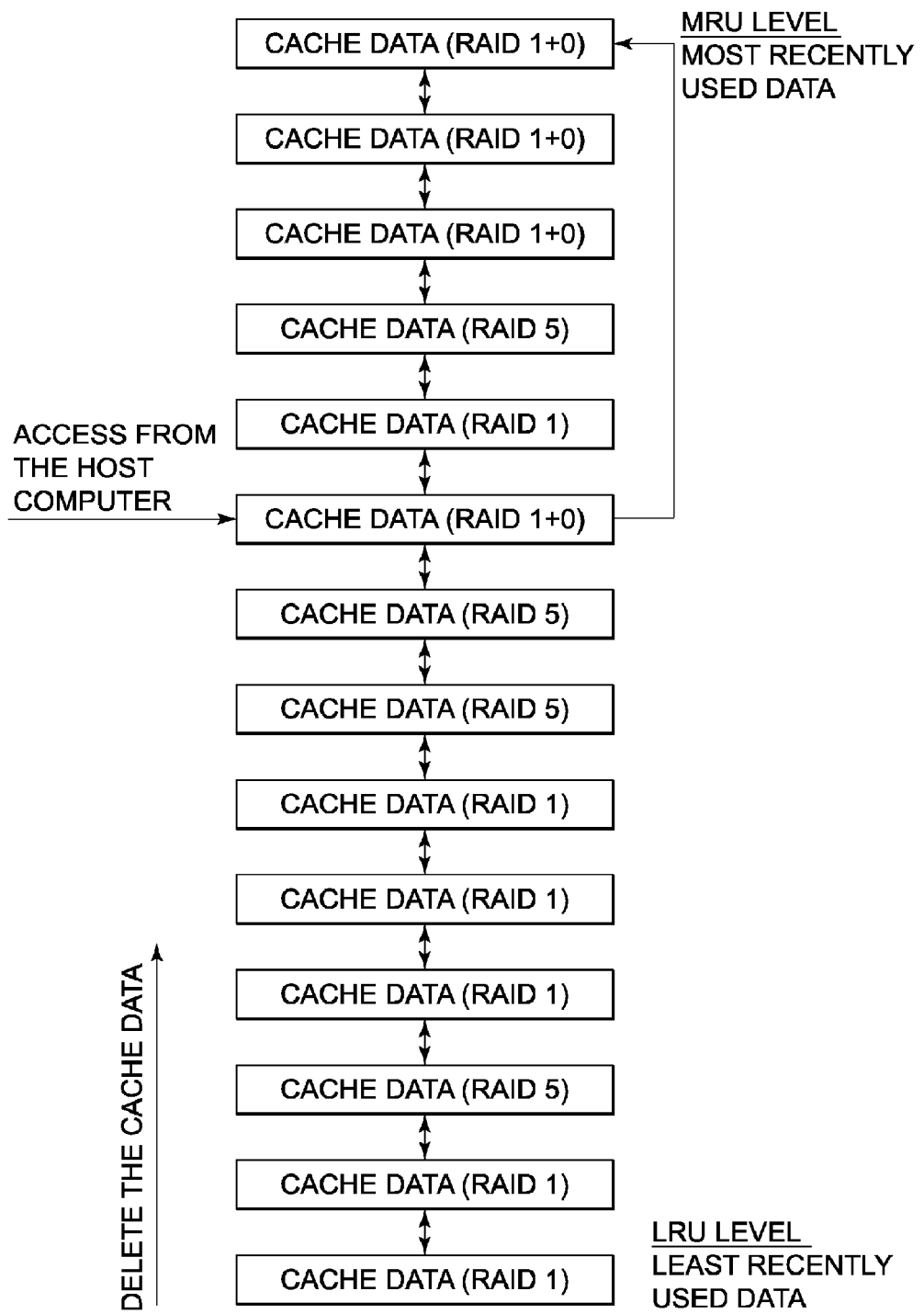
FIG. 2 is an explanatory diagram of a cache data management with the LRU method.

FIG. 2 is the explanatory diagram of the cache data management with the LRU method. As shown in FIG. 2, the data stored in the cache memory 16 of the RAID control apparatus 12 is ranked from the Most Recently Used (MRU) level to the Least Recently Used (LRU) level in accordance with a use of the data by the host computer 11. When the host computer 11 accesses the data stored in the cache memory 16, such situation is considered as a cache hit and the data are ranked at the MRU level as the most frequently accessed data. By contrast, the dirty data are written back to the RAID groups 10 asynchronously.

A RAID apparatus controller 18 is a controller for managing information on the RAID groups 10. The RAID apparatus controller 18 manages information on the write-back types according to the RAID levels of each RAID group 10. The information on the write-back types of each RAID group is information about whether the buffer for the parity calculation is needed on the write-back, and information on the loads on the hard disk drives. The buffer controller 19 is a controller for controlling the buffers to generate parity of the cache data in RAID 4, RAID 5 or RAID 6 when the data are written back. The information on the write-back types of each RAID group controlled by the RAID controller 18 and the information on the number of buffer requests in a queue controlled by a buffer controller 19 construct the write-back information for the write-back control as described later.

The write-back unit 41 is a processing unit to execute the write-back of the cache data. The cache data in RAID 4, RAID 5 or RAID 6 is written across a full strip bandwidth or in a part of the strip. A large write is a write-back in which all of the data are written in the full stripe. Meanwhile, a small write is a write-back in which the data in the stripe is partially renewed.

For the large write, the write-back unit 41 executes the write-back according to the following procedures. 1). Reserve the buffer. 2). Generate a new parity from the dirty data in a cache and then write the new parity in the buffer. 3). Write the dirty data in the cache and the new parity in the buffer on disks. 4). Free up the buffer.

For the small write, the write-back unit 41 executes the write-back according to the following procedures. 1). Reserve a buffer. 2). Read old data and an old parity from the disks and write them in the buffer. 3). Generate a new parity from the dirty data in the cache and the old data and the old parity in the buffer and then write the new parity in the buffer. 4). Rewrite the dirty data in the cache and the new parity in the buffer on the disks. 5). Free up the buffer.

Figure 3:
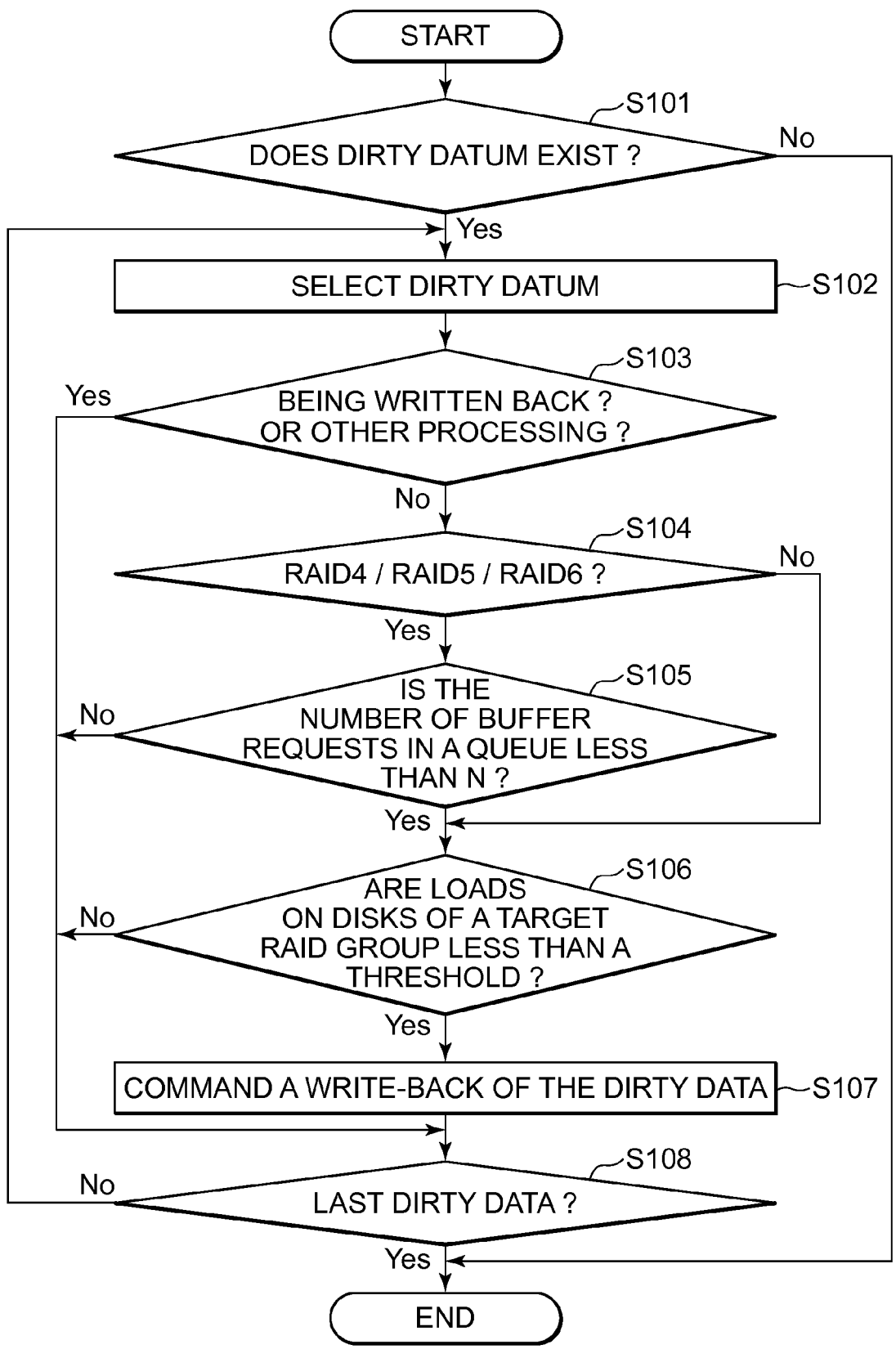
FIG. 3 is a flow chart showings processes to determine data to be written back by a write-back scheduler.

The write-back scheduler 42 is a processor that determines cache data to be written back and commands a write-back to the write-back unit 41. FIG. 3 is the flow chart illustrating the processes of write-back target determination processes by the write-back scheduler 42. The write-back target determination processes are processed when there is no disk access requested by the host computer 11.

As shown in FIG. 3, the write-back scheduler 42 judges whether the dirty data exists or not (operation S101). When there is no dirty data, the write-back scheduler 42 completes the determination process. Whereas, when the dirty data exists, the write-back scheduler unit 42 selects dirty data in order from the LRU level (operation S102). Subsequently, the write-back scheduler 42 judges whether the dirty data are being written back or another exclusive process is being executed based on the information managed by the cache memory manager 17 (operation S103).

Thereafter, when the dirty data are not being written or another process is being executed, the write-back scheduler 42 judges whether the dirty data are in RAID 4, RAID 5 or RAID 6 (operation S104). In other words, the write-back scheduler 42 judges whether the dirty data needs the buffer to calculate the parity in the write-back (write-back type). When the dirty data are not in RAID 4, RAID 5, or RAID 6, the determination process proceeds to a operation S106. In other words, when the dirty data does not need the buffer for the parity calculation in the write-back regardless of the buffer queuing state, the determination process proceeds to a operation S106. Thus, the write-back process is efficiently executed. Meanwhile, when the dirty data are in RAID 4, RAID 5, or RAID 6, the write-back scheduler 42 judges whether the number of the buffers requests in the queue is equal to or less than the arbitrary number N based on the information managed by the buffer controller 19 (operation S105).

When the number of buffer requests in the queue is equal to or less than the specific threshold N, the determination process proceeds to a operation S106. Then the write-back scheduler 42 judges whether the loads on the hard disk drives of the RAID groups to store dirty data are equal to or less than the threshold based on the information managed by the RAID apparatus controller 18 (operation S106). When the number of the buffer requests in the queue is equal to or less than the threshold, the write-back scheduler 42 commands the write-back unit 41 to write back the dirty data (operation S107).

Meanwhile, no write-back is commanded and the determination process proceeds to operation S108 when the loads on the hard disk drives of the RAID groups in which the dirty data are stored is not less than the threshold, or when the number of buffer requests in the queue is not less than the arbitrary number N, or when the dirty data are being written back or another exclusive process is being executed.

Then the write-back scheduler 42 judges whether there is other dirty data to be processed (operation S108). When there is other dirty data to be processed, the determination process goes back to the operation S102 and select next is completed.

As mentioned above, in this embodiment, the buffer controller 19 manages the information including the number of buffer requests in the queue. When the dirty data are in RAID 4, RAID 5, or RAID 6 and the number of buffer requests in the queue is not less than the arbitrary number N, the write-back scheduler 42 does not write back the dirty data. Thus, the suspensions of the write-back process attributed to the buffer request can be reduced and therefore the write-back can be executed efficiently. In addition, decreasing the arbitrary number N helps to reduce buffer request queuing. Hence, the free space of the cache memory can be increased and the performance of the RAID apparatus can be fully exercised.

The RAID apparatus having been described in this embodiment can be structured on a typical computer system basis. FIG. 4 is the structure block diagram of the computer system, i.e., the structure block diagram of a hardware environment.

As shown in FIG. 4, the computer system has a central processing unit (CPU) 20, a read-only memory (ROM) 21, a random-access memory (RAM) 22, a communication interface 23, a recording device 24, an I/O device 25, a potable recording medium reader 26 and a bus 27 that connects with all these components.

A recording medium in various forms such as a hard disk or a magnetic disk can be used as the recording device 24. In the recording device 24 or in the ROM 21, the RAID control program whose procedures are partially illustrated in the flow chart of FIG. 3 is stored. The write-back in this embodiment can be executed by processing the RAID control program by the CPU 20.

The RAID control program provided by a program provider 28 can be stored in the recording device 24 via a network 29 and the communication interface 23. Alternatively, the RAID control program can be stored in a commercially available portable recording medium 30. The commercially available portable recording medium 30 is mounted on the portable recording medium reader 26 and executed by the CPU 20. A recording medium in various forms such as a CD-ROM, a flexible disk, an optical disk, a magneto-optical disk or a DVD can be used as the portable recording medium 30. The write-back in this embodiment can be executed by reading the RAID control program stored in the recording medium by the portable recording medium reader 26.

A micro controller unit (MCU) or a micro processing unit (MPU) can be used instead of the CPU 20 of the computer system described in this specification.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A RAID apparatus having a plurality of recording devices, comprising:
   a first adaptor connected to a first interface which is connected to a high-level apparatus;
   a controller for controlling processing of data transmitted by said high-level apparatus; and
   a second adaptor connected to a second interface which is connected to a plurality of recording devices in which said data are stored,
   wherein said controller has a first memory area in which said transmitted data are stored;
   a second memory area that is used as a buffer for a write-back of data in said plurality of recording devices;
   a write-back information control unit controlling write-back information which indicates whether the second buffer is needed for a calculation on the write-back of the data stored in said first memory area and a usage state of said second memory area;
   a write-back determination unit for determination of data to be written-back based on said write-back information; and
   a write-back execution unit for executing a write-back of said data to be written back on said plurality of recording devices.

2. The RAID apparatus according to claim 1, wherein:
   the second memory area is used for a parity calculation in the write-back, and the write-back information includes information on existence or nonexistence of the parity calculation in the write-back of the data.

3. The RAID apparatus according to claim 2, wherein:
   when the second memory area is being used, the write-back determination unit determines data that does not use the second memory area as the data to be written back in the write-back.

4. The RAID apparatus according to claim 3, wherein:
   the write-back determination unit determines data to be written back based on the usage state of the second memory area and loads on the plurality of recording devices.

5. The RAID apparatus according to claim 1, wherein:
   the write-back information includes information on a number of requests in a queue.

6. A controller of a RAID apparatus having a plurality of recording devices, comprising:
   a first memory area in which transmitted data are stored;
   a second memory area that is used as a buffer for a write-back of data in said plurality of recording devices;
   a write-back information control unit controlling write-back information which indicates whether the buffer is needed for a calculation on the write-back of the data stored in said first memory area and a usage state of said second memory area;
   a write-back determination unit for determination of data to be written back based on said write-back information; and
   a write-back execution unit for executing a write-back of said data to be written back on said plurality of recording devices.

7. The controller of the RAID apparatus according to claim 6, wherein:
   the second memory area is used for the parity calculation in the write-back and the write-back information includes information on the existence or nonexistence of the parity calculation in the write-back.

8. The controller of the RAID apparatus according to claim 7, wherein:
   the second memory area is being used, the write-back determination unit determines data that does not use the second memory area in the write-back as the data to be written back.

9. The controller of the RAID apparatus according to claim 8, wherein:
   the write-back determination unit determines data to be written back based on the usage state of the second memory area and the loads on the plurality of recording devices.

10. The RAID apparatus according to claim 6, wherein:
    the write-back information includes information on a number of requests in a queue.

11. A write-back control method of a RAID apparatus having a plurality of recording devices, comprising:
    storing data transmitted by a high-level apparatus in a first memory area;
    determining data to be written back based on write-back information which indicates whether a second memory for a buffer is needed for a calculation on the write-back of the data stored in said first memory area and a usage state of the second memory area used in a write-back; and writing back said data to be written back to said plurality of recording devices.

12. The write-back control method of the RAID apparatus according to claim 11, further comprising:

using the second memory area for a parity calculation during the write-back; and including information about an existence or a nonexistence of the parity calculation in the write-back of the data.

13. The write-back control method of the RAID apparatus according to claim 12, further comprising:

determining data that does not use the second memory area in the write-back as the data to be written back when the second memory area is being used.

14. The write-back control method of the RAID apparatus according to claim 13, further comprising:

determining data to be written back based on the usage state of the second memory area and the loads on the plurality of recording devices.

15. The RAID apparatus according to claim 11, wherein:

the write-back information includes information on a number of requests in a queue.

* * * * *

UNITED STATES PATENT AND TRADEMARK OFFICE
CERTIFICATE OF CORRECTION

PATENT NO. : 8,364,893 B2
APPLICATION NO. : 12/179942
DATED : January 29, 2013
INVENTOR(S) : Hidejirou Daikokuya et al.

It is certified that error appears in the above-identified patent and that said Letters Patent is hereby corrected as shown below:

In the Claims:

Column 5, Line 64, In Claim 1, after "the" delete "second".

Signed and Sealed this
Fourteenth Day of May, 2013

Teresa Stanek Rea
*Acting Director of the United States Patent and Trademark Office*